US005355996A

United States Patent [19]

Hart

[11] Patent Number: 5,355,996

[45] Date of Patent: Oct. 18, 1994

[54] WEAR RESISTANT CERAMIC FIBER CONVEYOR ROLLS

[75] Inventor: Charles M. Hart, Concord Township, Lake County, Ohio

[73] Assignee: Global Consulting, Inc., Painesville, Ohio

[21] Appl. No.: 100,785

[22] Filed: Aug. 2, 1993

[51] Int. Cl.$^5$ .......... B65G 13/02

[52] U.S. Cl. .......... 198/780; 193/37; 432/236

[58] Field of Search .......... 198/780; 193/37; 492/46, 53, 54; 432/236, 246; 65/253, 374.13

[56] References Cited

U.S. PATENT DOCUMENTS

| | | | |
|---|---|---|---|
| 2,045,773 | 6/1936 | Havey | 432/236 |
| 2,788,957 | 4/1957 | Lindquist | 432/246 |
| 3,116,053 | 12/1963 | Ericsson | 432/236 |
| 3,456,931 | 7/1969 | Ermenc et al. | 432/246 |
| 3,853,526 | 12/1974 | Hochart | 193/37 X |
| 3,860,387 | 1/1975 | Bricmont | 432/236 X |
| 3,976,423 | 8/1976 | Schmidt | 432/236 |
| 4,352,230 | 10/1982 | Sukenik | 432/246 X |
| 5,070,587 | 12/1991 | Nakahira et al. | 432/246 |
| 5,205,398 | 4/1993 | Hart et al. | 198/780 |
| 5,230,618 | 7/1993 | Bricmont et al. | 432/246 X |

*Primary Examiner*—D. Glenn Dayoan
*Attorney, Agent, or Firm*—John J. Freer

[57] ABSTRACT

Highly compressed ceramic fiber conveyor rolls can provide desirable insulation coupled with extended wear for roller conveying of high temperature articles such as freshly made sheet glass. However, under harsh industrial conditions, as experienced with the conveying of heavy loads consistently at the upper end of operable temperature ranges, such ceramic fiber rolls may be subject to premature wear at the interface between an inner shaft and an outer ceramic fiber roll cover, as well as experience longitudinal roll cracking of the cover. It has now been found that both of these potential cover problems can be successfully addressed by placement within the cover of perforated, rigid disks. Such disks placed occasionally along the roll and within ceramic fiber cover, are particularly suitable for use with hardened covers, where the hardening is more concentrated towards the surface of the cover and the disks are present within a softer inner fiber core of the cover.

36 Claims, 1 Drawing Sheet

WEAR RESISTANT CERAMIC FIBER CONVEYOR ROLLS

BACKGROUND OF THE INVENTION

Rolls such as those employed as roller conveyors for use at high temperature can be made from an inner-metal shaft that has an outer insulating cover of asbestos. In manufacturing the roll, the asbestos can be supplied as annular disks which may be cut from asbestos board. The resulting rolls are usually referred to as asbestos board rolls. The assembly of asbestos disks onto a shaft to form a conveyor roll has been discussed for example in U.S. Pat. No. 3,802,495. These rolls can contain a binder which enhances the hardness and the wear resistance of the rolls. In use, the binder may burn out of the asbestos board rolls. As this occurs, disks separate and the asbestos cover can rotate on the interior shaft over which the disks have been assembled. As a result of this enlargement, the cover is prone to spin on the shaft. In an attempt to overcome this cover spinning, metal rings inserted in the cover with keys were tried with the asbestos board rolls.

It has also been known to place load bearing members, sometimes referred to as "tires" along an insulating roll cover. Such load bearing members have an exterior surface which is typically flush with the outer surface of the roll insulation. Such load bearing members are particularly desirable for providing rolls which have extended outer surface wear in the conveying of heavy loads.

It has also been known that to accommodate thermal expansion of binder-containing fiber roll covers, such covers can be made from fiber subassemblies which are placed on a shaft and separated in placement by separators means. The separators may be structural metallic members or non-structural items such as metal foils. As structural members, the separators may be flanged plates inserted between subassemblies, which subassemblies are composed of a plurality of fiber disks. These separators can provide expansion joints as has been discussed in U.S. Pat. No. 4,352,230.

It has been more recently taught in U.S. Pat. No. 5,205,398 that spacers may be utilized in roller conveyors having thermal insulation of highly compressed ceramic fiber. These spacers, rather than being load bearing members, are typically in foil form and can add flexibility to the covering for the roll.

As the applications for such highly compressed ceramic fiber rolls proliferate, more challenging industrial conditions, including harsh operating environments, are being met. Under these conditions, particularly for rigidized and highly compressed fiber roll covers, it will be desirable to extend the operational life of the cover while obviating failure phenomena, e.g., longitudinal cracking, which can cause premature cover failure. In addition to competitive ruggedness and long-service life, the cover should also exhibit desirable insulating characteristics as well as provide an environmentally appealing product.

SUMMARY OF THE INVENTION

There is now provided an improved, highly-compressed, ceramic fiber insulating roller. The improved roller has a highly compressed ceramic fiber insulation cover contained on a shaft or mandrel. To prepare this roller, there is not only provided highly compressed ceramic fiber for the cover, but there is also provided special rigid disks nestled within the fiber. The improved roller offers a complete ceramic fiber outer wear surface while coupling this with extended performance under harsh operating conditions. Moreover, by nestling the disks within the fiber, such improved roller can maintain an enhanced insulating characteristic. The new roller will thereby not only offer the desirable features found now in the highly compressed ceramic fiber rollers, but also will combine these features with improvements such as longitudinal crack resistance, as well as enhanced securing of the cover to the shaft.

In a broad aspect, the invention is directed to a roller especially adapted for use in roller conveying articles, which articles are at substantially elevated temperature, or which articles are being conveyed through a zone of substantially elevated temperature, which roller comprises an inner shaft having around said shaft at least one dense and refractory, elevated temperature resistant annular cover member of highly axially compressed at least substantially ceramic fiber. The roller now has an improved cover member having, on the shaft, a soft, ceramic fiber inner member and a hard, ceramic fiber outer member, with there being rigid, perforated disks spaced along the shaft and nestled within the soft ceramic fiber inner member, with said disks having outwardly projecting edges at perforations, which projecting edges are embedded in the soft ceramic fiber by axial compression of the cover member on the shaft, the ceramic fiber outer member being hardened to provide an outer weight bearing roller surface for contact with roller conveyed articles.

In another aspect, the invention relates to conveying apparati wherein sheet articles at elevated temperature are conveyed across insulated rollers, with the rollers being as described hereinabove.

DESCRIPTION OF THE PREFERRED EMBODIMENTS

For the roller, at least one roller cover insulating layer will be provided by highly compressed, at least substantially ceramic fiber. Typically a ceramic fiber blanket prepared from a readily available commercial silica-alumina fiber and having an initial density, as formed, of 8 pounds per cubic foot, or "8-pound blanket", can be compressed 50 percent to a density of 16 pounds per cubic foot. More typically, fiber will be compressed to provide a density within the range of from about 18 to about 40 pounds per cubic foot. The same readily available commercial fiber 8-pound blanket compressed above about 55 to 60 percent can provide a fiber density of on the order of greater than 20 to 22 pounds per cubic foot. If compressed more toward the top of the range, e.g., 80 percent or more, such 8-pound blanket will have density approaching 40 pounds per cubic foot. Such compression and range will be more particularly discussed hereinafter in conjunction with a description of the fibers. For such commercial ceramic fiber prepared from silica and alumina, a greater than 20 pounds per cubic foot density, e.g., an about 22 to 40 pound per cubic foot range of density, is highly advantageous for best fiber insulating characteristic. It is to be understood that compression may be of wet or dry fiber, but unless otherwise specified, compressed fiber densities are to be understood to be for dry fiber.

Figure 1:
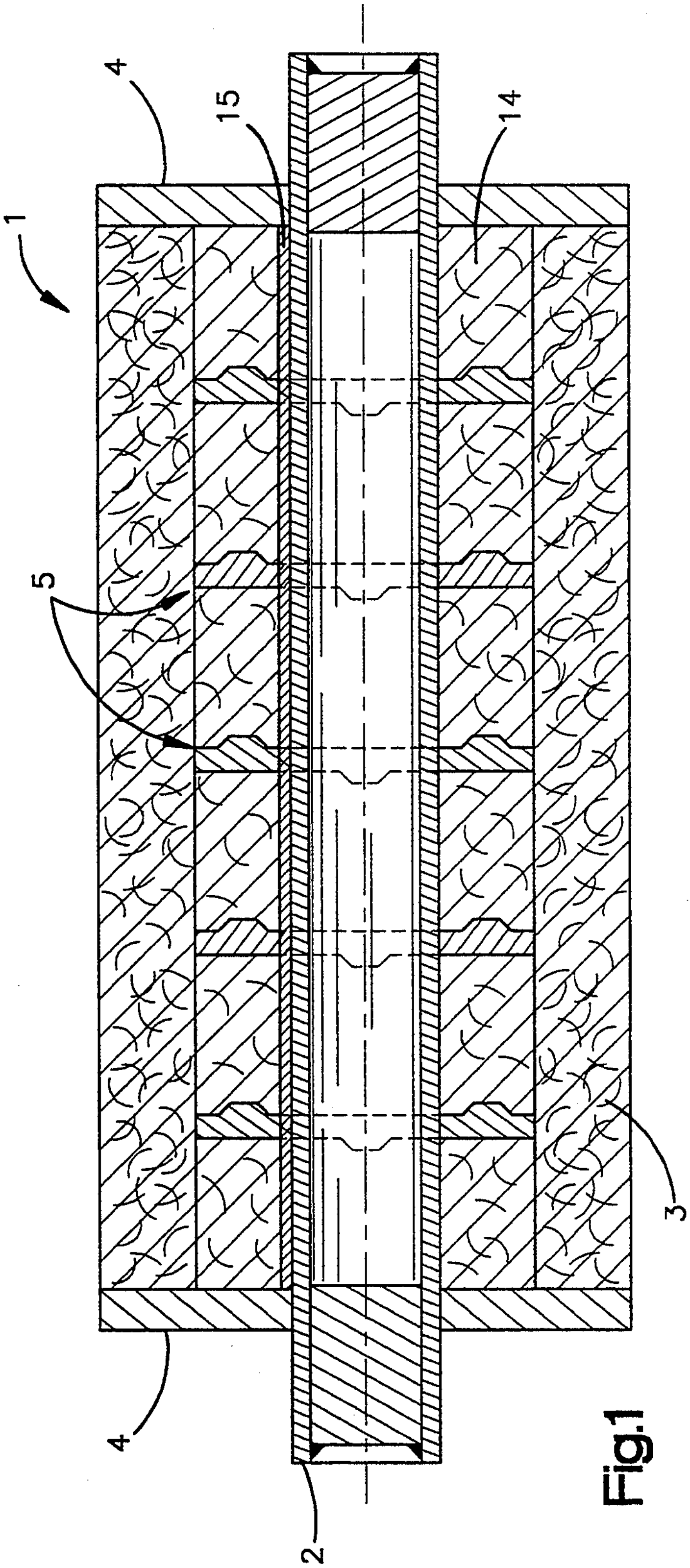
FIG. 1 is a cross-sectional view of a roller having rigid disks spaced along an inner shaft and nestled within a compressed ceramic fiber insulation cover.

Referring then to the figures, FIG. 1 shows a roll 1 comprised of a metal shaft 2 having a compressed fiber cover 3. The compressed fiber cover 3 is contained within end plates 4. The metal shaft 2 is supported and may be internally cooled, all by means not shown. The end plates 4 maintain compression on the compressed fiber cover 3, also by means not shown. Located within the fiber cover are rigid, radially extenuating disks 5. The disks 5 are nestled within the soft fiber 14 of the fiber cover 3 and extend radially out about half-way from the metal shaft 2 to the outer edge of the fiber cover 3.

Figure 2:
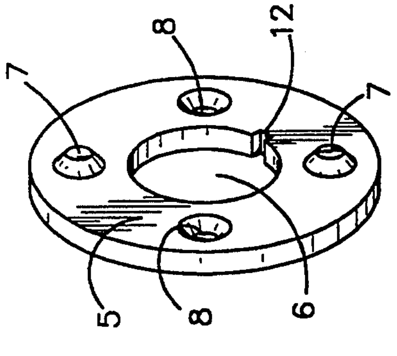
FIG. 2 is a perspective view of a disk in perforate form with outwardly projecting edges at the perforations.

As seen in FIG. 2, each disk 5 also has an aperture 6 through which the metal shaft 2 (FIG. 1) can project. The disks also have two sets of perforations 7,8. In this perforated disk 5, a first set of two perforations 7 have outwardly projecting edges on the front face of the disk. Then, a second set of two perforations 8 have outwardly projecting edges at the reverse face of the disk. A keyway 12 is also present at the aperture 6 of the disk 5 to conform with a key 15, on the shaft 2 (FIG. 1).

Figure 3:
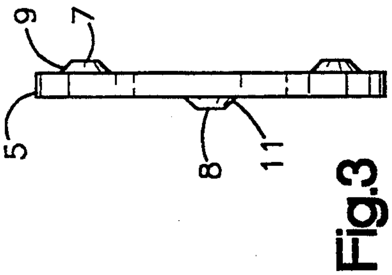
FIG. 3 is a side view of the perforated disk of FIG. 2.

The disk 5 of FIG. 2 is shown in side view in FIG. 3. As depicted in FIG. 3, the perforations 7 have outwardly projecting edges 9 on one face of the disk 5. Then, on the opposite face of the disk 5, the perforations 8 have outwardly projecting edges 11. These outwardly projecting edges 9, 11 flare away from the faces of the disk 5. Although only a few perforations, each of the same size, have been shown in the disk of the figures, it is to be understood that a greater or lesser number of perforations, which may be of different sizes, may be present in an individual disk. Moreover disks even in the same cover may have different numbers and sizes of perforations.

In assembly of the roll 1, the fiber will be accumulated on the metal shaft 2, usually by simply sliding fiber sections over the shaft 2. When a sufficient axial thickness of fiber is present on the shaft 2, a disk 5 can then be slipped over the shaft 2 and pressed into the fiber on the shaft 2. If the shaft 2 has a key 15, the keyway 12 will be matched to fit over the key 15. This process is simply repeated until the shaft 2 has been provided with the desired length of cover. As will be discussed hereinbelow, the fiber sections being accumulated on the shaft 2 may contain additional substances such as rigidizer or binder, preferably providing a soft center area 14 to the fiber sections. With this construction, the rigid disks 5 when moved onto the shaft 2 can be pressed snugly into the soft fiber core 14 of the cover. This tight engagement between the fiber section and the rigid disk 5 is enhanced by the indentation into the fiber of the projecting edges 9, 11 of the disk 5. If the fiber has not been rigidized prior to assembly on the shaft 2, such can be accomplished after assembly. As in the structure discussed hereinbefore, any subsequent application of rigidizer to the fiber is preferably carried out so as to maintain a soft center 14 for the fiber. After the roll has been assembled, further operation may be desirable. Such operations, such as hardening, have been discussed in U.S. Pat. No. 5,205,398, the teachings of which are incorporated herein by reference.

The rigid disks 5 will typically have a thickness axially of at least about 0.060 inch up to about 0.250 inch. Usually, the disks will have a thickness within the range of from about 0.10 to about 0.20 inch. Although it is contemplated that the discs will project radially out from the shaft for a distance at least substantially less than the outer diameter of the ceramic fiber, e.g., for about half the distance into the fiber, they may project less, such as only 20 to 30 percent of the radial dimension of the fiber. On the other hand, the disks may extend substantially to the cover surface, such as 90 percent of the cover radial dimension. For enhanced protection against cracking of the fiber cover, the hard disks can be spaced apart from each other as infrequently as only about every 12 inches along the shaft. For enhanced cracking resistance, the disks might be placed closer to one another, e.g., placed as frequently as about every inch. Typically, a spacing of about 3 to 5 inches per disk along the shaft will be serviceable. Although the rigid disks may be metal or ceramic, they are advantageously metal for economy. Usually the disks will be of such metals as will be useful for the shaft, i.e., steel, cold-rolled steel or stainless steel.

The size of the perforations in the disk can be quite small compared to the center aperture of the disk through which the metal shaft projects. Typically, perforations will have diameters within the range of from about 0.04 inch to about one inch. Larger diameter perforations are advantageous where more greatly extending projections for the projecting edges will be desirable, e.g., for best bonding between the disks and the fiber. Serviceable perforation diameters can be within the range of from about ¼ inch to about ½ inch. Usually, the projecting edges at the perforations need extend outwardly away from the face of the disk in only a very minor amount, such as an amount within the range from about 0.01 to about 0.03 inch. These projections can be formed by any method suitable for providing an aperture in the disk which will leave a projecting edge after aperture formation, such as by die punching. Usually, only a few perforations will be needed in each disk, e.g., on the order of 12–16 perforations for a disk having an 8½ inch outside diameter and a 5½ inch inside diameter, to provide snug contact between fiber and disk. However, a substantial amount of the disk may be perforated, so long as the disk maintains rigidity, i.e., so that the disk cannot be readily manually bent, or inadvertently bent upon installation on the shaft, such as would typically be the case for a metal foil.

Most typically, the perforations will be from about ¼ inch to about 2 inches apart. The perforations can be in staggered arrangement around the disk so long as the area of the disk permits. That is, the centers of the perforations need not form a circle, when the disk is viewed on its face. Preferably, perforations are made on each disk in opposite directions, as depicted in FIGS. 2 and 3. With this structure the projecting edges at the perforations extend from both faces of the disk to grip the fiber at both disk faces. This enhances engagement of the disk with the fiber at each major face of the disk. It will be understood that the disks may have other outwardly projecting members on the disk face for gripping of the fiber, e.g., projections such as spikes.

By "at least substantially ceramic fiber" for the fiber of the cover it is meant that the fiber will be a major amount, i.e., greater than 50 weight percent, but more usually greater than 80 weight percent to all, of ceramic fiber. The minor amount, i.e., under 50 weight percent, in the cover can be other synthetic or natural mineral fiber, e.g., glass fiber or mineral wool, including mineral wool with additives. Although it is contemplated that such ceramic fiber may be other than a silica-containing fiber, as represented by an alumina fiber or fiber of boron compound material, e.g., fibers of boron oxide, boron carbide or boron nitride, it is preferred for economy that the ceramic fiber be a silica-containing fiber. The silica-containing fiber may simply be silica fiber, although usually the silica is present with one or more of alumina, zirconia, chromia, or titania. Such silica-containing fibers are also meant to include fibers from silicon nitride, silicon carbide, calcium-aluminum silicate and the like.

It will be understood that the fiber may be prepared by any process useful for preparing ceramic fiber. Commercially, such processes include those which fiberize a molten stream, e.g., blowing of a molten stream to fiberize the molten material, or causing the molten stream to impact rapidly spinning wheels which fiberizes the melt. Commercial manufacture also includes sol-gel processing.

As ceramic fibers are produced, it will be typical that they will be initially accumulated together into a mat form. These fibers in mat form may be compressed. The initial mats will have a density on the order of from about 2 to about 8 pounds per cubic foot, and after consolidating the fiber, the accumulated fibers as blankets will have a density on the order of from about 4 to 10 pounds per cubic foot for ceramic fiber. The mats or blankets, the fiber in which may also be generally referred to herein as "bulk" fiber, can be stamped or cut into disc shape. Bundles of these discs, especially when stamped from a thin blanket, may then be precompressed into multiple-disc "sections". Discs can be compressed into typically 1 inch to 4 inch thick sections.

The individual fibers in the bulk fiber may be of varying lengths. All fibers will typically have a length of at least about 0.5 inch, with long fibers usually having length within the range of from about 8 inches up to a length of about 10 inches. A more typical bulk fiber mixture for fibers of varying lengths has some individual short fibers at least about 2 to 4 inches long, in mixture with long fibers. In some applications it can be useful to employ milled fiber or chopped fiber, or both. Chopped fiber i.e., bulk fiber which has been chopped, can have individual fibers generally from 0.25 inch to one inch in length. Milled fiber, typically fiber that has been chopped and subsequently ball-milled, can be of extremely short, and more uniform length. Fiber lengths for milled fiber can be on the order of 10 to 30 microns. Although mixtures are contemplated for milled fiber with other fibers, e.g., one or more of chopped fibers or the above described fibers of varying lengths, it is to be understood that the milled fiber may be utilized by itself. Milled fiber may be used in applications in rollers where elevated shot content, or shot of enlarged size, or both, may be deleterious, such as rollers utilized with stainless steel strip in catenary lines where shot can lead to marking of the product. As the word is used herein, "shot" refers to the non-fibrous, and usually chunky, ceramic particles that are found in bulk ceramic fiber, e.g., ceramic fiber blanket. Use of milled fiber may enhance roller serviceability, since milling of the fiber tends to crush shot particles to a size of less than about 20 microns, thus reducing to eliminating concern for product marking.

It has not been industrial convention to substantially compress ceramic fiber owing to a concern for crushing the fiber. It has however recently been found that discs of the fiber on a shaft can be highly axially compressed, as discussed in U.S. Pat. No. 5,205,398 the contents of which are herein incorporated by reference. Such compression for ceramic fiber should be in an amount from above about 50 percent up to most always about 80 percent, although slightly greater compression, i.e., 83 to about 85 percent might be achieved. A compression of less than about 50 percent will not provide for a desirable dense fiber having the requisite resistance to compression at the roll surface as required in the industry. On the other hand, most always a compression of greater than about 80 percent may lead to fiber crushing. Advantageously for desirable roll strength and resistance to surface compression, the ceramic fiber will be compressed in an amount above about 55 percent, or more often above about 60 percent and preferably within a range of from about 65 to about 75 percent.

The amount of compression tolerated by the fiber without deleterious fiber crushing may be determined by the wet or dry condition of the fiber. In brief, wet fiber is fiber that has been wetted, such as with a lubricant, rigidizer or binder, each of which will be discussed hereinbelow, and the fiber can appear and feel wet to the touch. As a general rule, wet fiber can be more highly compressed without running as great a risk of fiber crushing. By wet fiber, it is meant to include fiber which is simply wetted by water. More typically, a lubricant will be used. By use of the word "lubricant" herein there is meant the use of a substituent which will volatilize without providing more than an incidental residue in the roller, and preferably, no residue. Generally, the lubricants are organic materials such as soap dispersions. The lubricant can be applied to the fiber in mat form, or to a disc or section, e.g., that has been partially compressed. The lubricant can penetrate into the partially compressed fiber mass, as by wicking. The resulting lubricated fiber mass is then subjected to final compression.

For some applications it may be desirable to use a binder in the compressed fiber roll cover. Such may be a "fugitive binder", that is, a binder that will be readily susceptible to volatilization from the cover during drying of the cover or at elevated temperature use. Such fugitive binder may readily penetrate into the compressed fiber roll. It may also be referred to herein as an "organic binder", and representative such binders include starch, latex materials and cellulosic substituents, e.g., an aqueous suspension of cellulose methyl ether. The word "binder" may also refer to a substance which will not readily penetrate into the compressed fiber roll, such as by wicking, in appreciable amount. These binders, sometimes referred to herein as "inorganic binders", in general may be used with the fiber prior to or after compression. Representative inorganic binders include cements, calcium aluminate and clays.

If the material used is capable of impregnating the compressed fiber roll, i.e., wicking into the compressed fiber roll, as well as also leaving a residue within the roll on drying and which will be retained in the roll for roller use, such material is referred to herein for convenience as a "rigidizer". Representative rigidizers are such as colloidal silica, colloidal alumina, colloidal zirconia, or similar liquid materials. Where the rigidizer used is in colloidal form, it may be referred to herein as a "colloidal rigidizer". The rigidizer may be applied to the fiber either before compression or after. It may be applied to fiber sections, or to a complete roll cover, or both. The method used may be any of those typically employed for impregnating a fiber with a liquid, e.g., soaking or spraying or the like. Even for the most highly compressed fiber, i.e., the about 80 percent or more fiber compression, a rigidizer mixture, e.g., a solution containing colloidal silica or colloidal alumina or both in a liquid vehicle, will readily impregnate the roll cover by capillary action, or "wicking", and can penetrate completely throughout the compressed ceramic fiber. It is however to be understood that such penetration is preferably limited to only an outermost layer of the compressed ceramic fiber, or advantageously provides only a gradation of the rigidizer, which is then most concentrated at the outer roller fiber surface. This provides a soft, inner ceramic fiber center for the roll. Thus, for the roll having the soft inner member and hard outer member there may not be a sharp break in hardness from the outer portion of the roll to the inner portion. Rather, it can be a gradual softening, from the outer to the inner roll zones as provided by wicking. It will be not unusual for the soft inner portion of the roll, or soft inner member, to be on the order of 40% to 60% softer than the roll outer member, as determined by hardness testing with a Schmidt hammer.

Generally, the rigidizer composition will include colloidal silica such as a LUDOX® colloidal silica dispersion manufactured by E. I. DuPont de Nemours and Company. It is to be understood that where a rigidizer composition such as a silica sol is to be used, it can be further modified to contain additives, and these can include an organosilane coupling agent, or a polymeric agent such as an acrylic polymer. It is also contemplated that compressing and rigidizing can be a multi-step process. Moreover, whenever the rigidizer is used, it can be used in a multi-step, impregnate-dry-impregnate operation terminating in a final drying step.

Generally, the rigidizer will be used in an amount to provide from about 5 weight percent up to about 70 weight percent or more, and preferably about 15 to 60 weight percent, of rigidizer residue after drying of the roll, in the total weight of the roll. After use, the resulting impregnated cover should be dried. Drying, as may be accomplished at quite elevated temperature, e.g., 500° C., but also at more modest temperature such as from about 300° C. down to about 100° C. or below. Thereafter, the fiber cover may be further conditioned, e.g., the cover can be heat treated at an elevated temperature of as much as up to about 2000° F. for an impregnated ceramic fiber, thereby vaporizing any fugitive solvent or liquid vehicle of a rigidizer or of a binder and leaving the residue in the compressed fiber roll cover.

I claim:

1. In a roller especially adapted for use in roller conveying articles, which articles are at substantially elevated temperature, or which articles are being conveyed through a zone of substantially elevated temperature, which roller comprises an inner shaft having around said shaft at least one dense and refractory, elevated temperature resistant annular cover member of highly axially compressed at least substantially ceramic fiber, the improvement in said roller comprising a cover member having on said shaft, a soft, ceramic fiber inner member and a hard, ceramic fiber outer member, with there being rigid, perforated disks spaced along said shaft and nestled within the soft ceramic fiber inner member, with said disks having outwardly projecting edges at perforations, which projecting edges are embedded in the soft ceramic fiber by axial compression of said cover member on said shaft between roller end plate means, said ceramic fiber outer member being hardened to provide an outer weight bearing roller surface for contact with roller conveyed articles.

2. The roller of claim 1, wherein said shaft includes a tubular member adapted for internal cooling and said shaft is a metal shaft comprised of steel or stainless steel.

3. The roller of claim 1, wherein said inner shaft has a key extending axially along said shaft and said disks have a keyway conformed to fit said key.

4. The roller of claim 1, wherein said disks are ceramic or a metal comprised of steel or stainless steel.

5. The roller of claim 1, wherein said disks have an outer diameter which is at least substantially less than the outer diameter of said compressed ceramic fiber.

6. The roller of claim 1, wherein said disks have an outer diameter which is about one-half the outer diameter of said compressed ceramic fiber.

7. The roller of claim 1, wherein said disks have thickness within the range from about 0.060 inch to about 0.250 inch.

8. The roller of claim 1, wherein said disks are placed axially along said shaft from about every one inch to about every 12 inches.

9. The roller of claim 1, wherein said disks have from about ¼ inch to about 2 inches of metal between each perforation.

10. The roller of claim 1, wherein said perforations are in staggered arrangement around said disk.

11. The roller of claim 1, wherein said disks have said edges projecting outwardly on opposite faces of the disk.

12. The roller of claim 1, wherein said disks have perforations of diameter within the range from about 0.04 inch to about 1 inch and said edges project outwardly in an amount within the range of from about 0.01 inch to about 0.03 inch.

13. The roller of claim 1, wherein said disks have outwardly projecting members other than said edges.

14. The roller of claim 1, wherein said ceramic fiber consists of a major amount of silica-containing ceramic fiber with a minor amount comprising one or more of fiberglass, aluminum fiber, fibrous boron compounds or mineral wool, and said ceramic fiber comprises silica with one or more of alumina, zirconia, chromia, or titania.

15. The roller of claim 1, wherein said annular cover member has fibers compressed in an amount above about 50 percent to a fiber density, basis dry fiber, of at least about 16 pounds per cubic foot.

16. The roller of claim 1, wherein said annular cover member has fibers compressed in an amount above about 55, or above about 60, percent, and up to about 85 percent, to a fiber density, basis dry fiber, above about 20, or above about 22, pounds per cubic foot.

17. The roller of claim 1, wherein said highly compressed ceramic fiber is a mixture of fibers having length of at least about 0.5 inch and including short fibers of lengths within the range of from about 2 inches to about 4 inches, and long fibers of lengths within the range of from about 8 inches to about 10 inches.

18. The roller of claim 1, wherein said annular cover member is compressed fiber comprising ceramic fiber plus one or more of rigidizer or binder.

19. The roller of claim 18, wherein said annular cover member has a gradual softening in a radial direction of said roll which provides said hard outer member and soft inner member.

20. The roller of claim 18, wherein said annular cover member has an about 40% to 60% softer inner member than outer member.

21. The roller of claim 18, wherein said annular cover member comprises compressed fiber plus one or more rigidizers of colloidal silica, colloidal alumina, colloidal zirconia or silane, or one or more binder of cement, starch, clay, calcium aluminate, latex materials or cellulosic substituents.

22. The roller of claim 18, wherein said compressed ceramic fiber has said outer member hardened by residue from said rigidizer or binder.

23. The roller of claim 1, wherein said roller comprises an outer groove machined in said fiber and said groove has at least one load bearing castable member cast in said groove.

24. The roller of claim 1, wherein said highly compressed fiber is at least substantially enveloped in a load bearing, refractory annular sleeve member.

25. In a conveying apparatus wherein sheet articles at elevated temperature are conveyed across rollers having an inner shaft and around said shaft at least one dense and refractory, elevated temperature resistant insulating cover member of highly-axially compressed at least substantially ceramic fiber, the improvement in said conveying apparatus comprising rollers having on said shaft, a soft, ceramic fiber inner member and a hard, ceramic fiber outer member, with there being rigid, perforated disks spaced along said shaft and nestled within the soft ceramic fiber inner member, with said disks having outwardly projecting edges at perforations, which projecting edges are embedded in the soft ceramic fiber by axial compression of said cover member on said shaft by roller end plate means, said ceramic fiber outer member being hardened to provide an outer weight bearing roller surface for contact with roller conveyed articles.

26. The conveying apparatus of claim 25, wherein said fiber is compressed in an amount above about 50 percent to a fiber density, basis dry fiber, of at least about 16 pounds per cubic foot.

27. The conveying apparatus of claim 25, wherein said compressed fiber is compressed in an amount above about 55, or above about 60, percent, and up to about 85 percent, to a fiber density, basis dry fiber, above about 20, or above about 22, pounds per cubic foot.

28. The conveying apparatus of claim 25, wherein said inner shaft has a key extending axially along said shaft and said disks have a keyway conformed to said key.

29. The conveying apparatus of claim 25, wherein said disks are ceramic or a metal comprised of steel or stainless steel.

30. The conveying apparatus of claim 25, wherein said disks have an outer diameter which is at least substantially less than the outer diameter of said compressed ceramic fiber.

31. The conveying apparatus of claim 25, wherein said disks have said edges projecting outwardly on opposite faces of the disk.

32. The conveying apparatus of claim 25, wherein said disks have outwardly projecting members other than said edges.

33. The conveying apparatus of claim 25, wherein said ceramic fiber consists of a major amount of silica-containing ceramic fiber with a minor amount comprising one or more of fiberglass, aluminum fiber, fibrous boron compounds or mineral wool, and said ceramic fiber comprises silica with one or more of alumina, zirconia, chromia, or titania.

34. The conveying apparatus of claim 25, wherein said annular cover member is compressed fiber comprising ceramic fiber plus one or more of rigidizer or binder.

35. The conveying apparatus of claim 34, wherein said annular cover member comprises compressed fiber plus one or more rigidizers of colloidal silica, colloidal alumina, colloidal zirconia or silane, or one or more binder of cement, starch, clay, calcium aluminate, latex materials or cellulosic substituents.

36. The conveying apparatus of claim 34, wherein said compressed ceramic fiber has said outer member hardened by residue from said rigidizer or binder.

* * * * *